Feb. 26, 1952   B. A. VANDER HEYDEN   2,587,413
VENTED CORE AND MOLD ASSEMBLY FOR MOLDING MACHINES
Filed Feb. 28, 1949
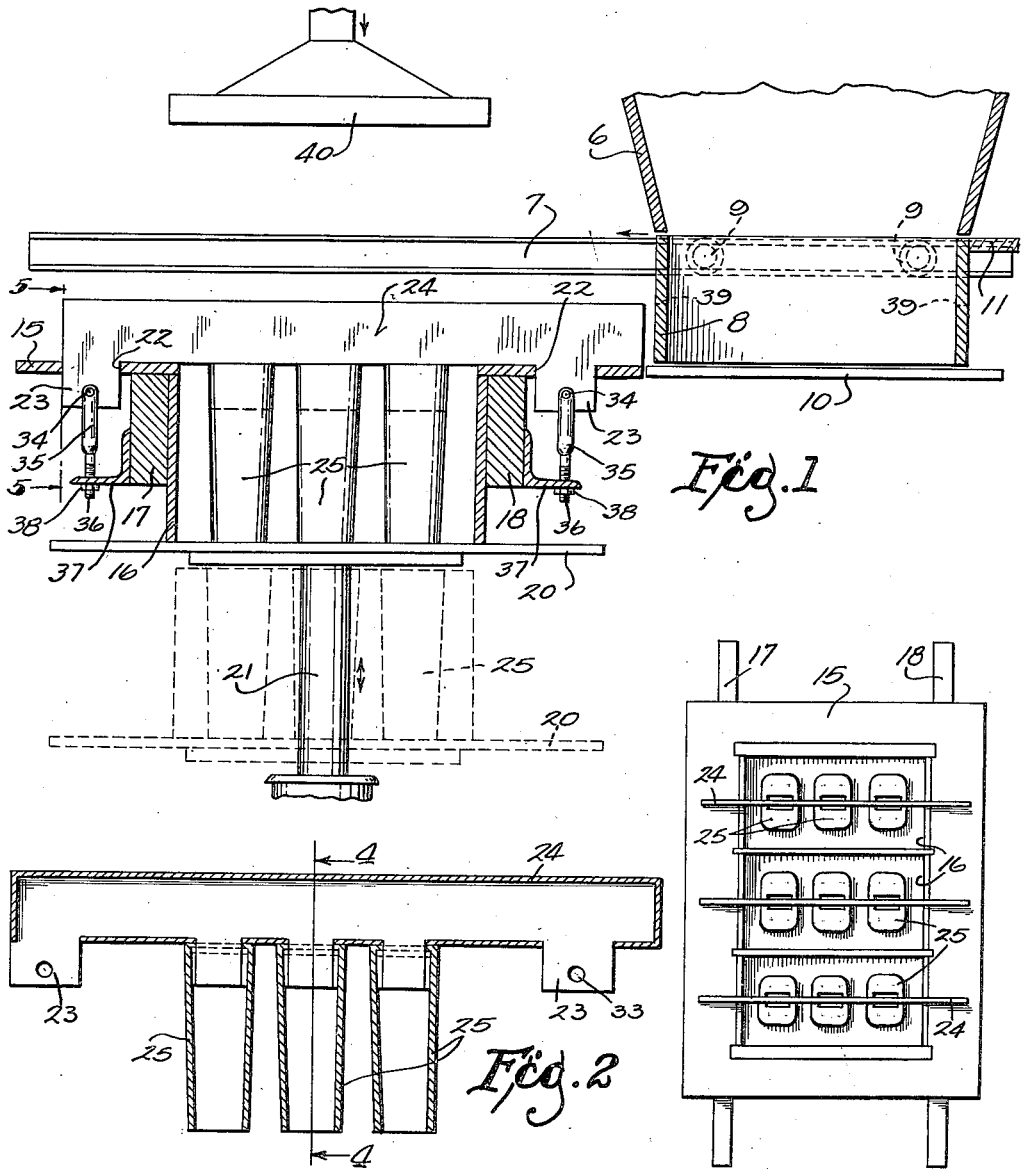
Inventor
BERNARD A. VANDER HEYDEN
By 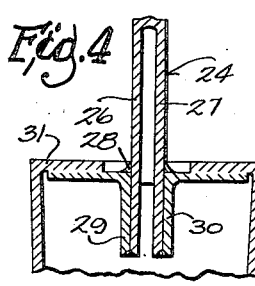
Attorneys Patented Feb. 26, 1952

2,587,413

UNITED STATES PATENT OFFICE 2,587,413

VENTED CORE AND MOLD ASSEMBLY FOR MOLDING MACHINES

Bernard Aloysius Vander Heyden, Milwaukee, Wis.

Application February 28, 1949, Serial No. 78,789

2 Claims. (Cl. 25—119)

This invention relates to a vented core and mold assembly for a molding machine.

It is a primary object of the invention to provide a simple vented core which can be made without added cost and which operates with added effectiveness to vent the core, both during the filling, and withdrawing, of the mold, the venting desirably being achieved through the core support and between the flanges whereby the core support and core are anchored to the mold.

The invention has particular utility in a molding machine of the type in which the pallet and finished article are lowered from the mold, but the details of the core construction are also applicable to machines of the type in which the mold is lifted from the molded article.

In the drawings:

Fig. 1 is a view in transverse section through a concrete block machine equipped with a mold and core organization embodying the invention, the core being shown in elevation.

Fig. 2 is a view of the core and core support in section in a plane parallel to that in which Fig. 1 is taken.

Fig. 3 is a plan view of the mold with the cores supported therein.

Fig. 4 is a fragmentary detail view taken in the plane indicated by the line 4—4 in Fig. 2.

Fig. 5 is a fragmentary detail view taken in the plane indicated by the line 5—5 in Fig. 1.

Since the invention pertains to the mold and cores, the cement block machine as a whole is only fragmentarily illustrated. It comprises a hopper 6 through which the cementitious mix is supplied. Beneath the hopper is provided a forwardly extending way which includes the channel 7 along which the transfer box 8 is reciprocable on rollers 9. The stationary deck at 10 holds in the bottomless transfer box 8 an amount of mix determined by the capacity of the box so that as the box moves forwardly upon its ways, this amount of mix is ultimately dumped into the mold for the filling thereof. In the forward movement of the box, the bottom of the hopper 6 is closed, in conventional manner, by the tail board 11 which moves with the box beneath the hopper.

Immediately forwardly of the stationary deck 10 is the mold table 15 which is apertured in registry with the mold 16. The mold 16 and table 15 are supported on stringers 17, 18 to comprise a unitary mold assembly, mounted in the machine as such. The bottom, as well as the top, of the mold 16 is open. During the mold-filling operation, the bottom of the mold is temporarily closed by means of the pallet 20 which is raised to the position shown in full lines in Fig. 1 and lowered to the position shown in dotted lines in Fig. 1 by means of a ram 21.

As shown in Figs. 1 and 5, the mold table 15 is provided with openings at 22 for the spaced ears 23 of each of the mold supports at 24. The molds 25 are suspended from the supports and rigidly connected therewith in the manner best shown in Fig. 4.

Each of the supports 24 comprises closely spaced parallel side walls 26, 27 from which the ears 23 project. To these side walls are welded at 28 the flanges 29, 30 respectively. These flanges have previously been welded or otherwise fastened into the top 31 of each of the cores 25 so that when the sides 26 and 27 of the support enter between the flanges 29 and 30, and the welds 28 are made to anchor them in position, the cores are rigidly supported, and the upper ends of the cores are closed except for the communication established between the side plates 26 and 27 of support 24 with the interior of each core as is clearly shown in Fig. 4.

It is usual to suspend one or more cores from each support as is clearly shown in Figs. 1, 2 and 3. The supports, with their integrally attached suspended cores, are then positioned on the mold table with their depending ears 23 extending through the apertures 22 of the table. The ears have transversely registering holes 33 to receive the clevis pins 34 which may be bolts. These pins securely fasten each core support 24 to the clevises 35 at the end of bolts 36. These bolts pass through the anchor flanges 37 on stringers 17, 18, and are tightened by means of nuts 38 to draw the supports 24 into intimate contact with mold table 15.

As best shown in Fig. 5, the interior of each of the hollow supports 24 is in communication with the atmosphere between the ears 23 where these ears extend downwardly through the openings 22 in the mold table. Thus, the atmospheric communication of the molds through the supports with the atmosphere is protected from access of the cementitious mix, the protection being assured both by reason of the fact that the atmospheric communication is in a downwardly direction, and by reason of the further fact that it is effected beneath those portions of the table which overhang the mold.

Just as is the case where solid core supports are used, the transfer box 8 is slotted at 39 to pass the supports, the slots being indicated by dotted lines in Fig. 1. The transfer box, being full of mix derived from hopper 6, passes over the surface of the table 15 into registry with the mold, whereupon the contents of the box are discharged into the mold, the capacity of the box being predetermined to fill the mold about the cores therein. The cores correspond in height to the mold so that they are closely abutted by the pallet 20 as the pallet is urged upwardly on ram 21 into contact with the bottom of the mold. The fit of the pallet to the cores is sufficient to preclude any substantial flow of cementitious mix into the cores, but the air will escape freely through the cores and the supports therefor and between the ears 23 to the atmosphere. This clearly facilitates the distribution of the mix in the mold.

As is common in devices of this character, the mix is then compacted within the mold, as by means of the tamping device diagrammatically illustrated at 40 in Fig. 1, this being used after the transfer box 8 has returned beneath the hopper 6.

For economy of operation, it is desirable that the finished article, while still completely green, be removed from the mold and the cores, in order that a new article may immediately be cast in the same mold. While the cores are, as usual, tapered to facilitate their relative withdrawal from the freshly molded material, it is found that no reasonable degree of taper is adequate to relieve the vacuum which results from the initial withdrawal of the core.

The amount of taper which may be employed is limited by considerations having to do with substantial uniformity of wall thickness of the molded article. While it is recognized that cores have previously been vented, the present venting arrangement is particularly valuable in machines of the type herein disclosed where the pallet and the article move downwardly away from the stationary mold and cores. The present arrangement is also particularly valuable, apart from the type of machine in which it is used, in that the venting communication of the cores with the atmosphere is achieved in such a manner that no mix can enter the venting passages.

As the ram 21 is lowered to withdraw the pallet 20 and the freshly molded article from the mold 16 and the cores 25, any tendency to form a vacuum within the article is immediately relieved by a rush of air from the atmosphere between the ears 23 of the core supports and through the hollow interior of the supports into the respective cores and through their open bottoms. Thus, the article is cleanly withdrawn from each core, and the device will function indefinitely without clogging because of the impossibility of any of the mix reaching the interior of the venting passages. Cores of this type will not fill with concrete. This eliminates any cleaning problem. Heretofore, cores have often filled with concrete and stopped all venting, and the cast articles then collapse when the core is withdrawn.

I claim:

1. In a device of the character described, the combination with a mold including laterally projecting table means, the mold opening upwardly and the table means having apertures at opposite sides of the mold, and anchorage members connected with the mold beneath said apertures; of a removable unitary bar and core assembly spanning the mold and resting upon the table means, the said assembly having a hollow bar portion upwardly closed and provided with downwardly projecting laterally spaced ears positioned in said apertures, and the assembly comprising a hollow core portion connected with and suspended from the bar portion and disposed within the mold, the hollow core portion communicating with the interior of the hollow bar portion of said assembly and having an open bottom; together with tension elements adjustably connected between said anchorage members and the ears aforesaid and holding the bar portion of said assembly to the table portion of the mold, the said bar portion having openings between the ears for venting the core portions of said assembly through the bar portions and downwardly through the table portion of said mold.

2. The combination set forth in claim 1 in which the mold has an open bottom, in further combination with a ram positioned beneath the mold and adapted for raising and lowering successive pallets to and from the mold for the temporary closure of the mold and the downward removal of blocks therefrom.

BERNARD ALOYSIUS VANDER HEYDEN.

REFERENCES CITED

The following references are of record in the file of this patent:

UNITED STATES PATENTS

| Number | Name | Date |
|---|---|---|
| 857,364 | Rosback | June 18, 1907 |
| 1,237,887 | Ferguson | Aug. 21, 1917 |
| 1,416,691 | Crozier | May 23, 1922 |
| 1,905,975 | Thomas | Apr. 25, 1933 |
| 2,136,009 | Holland, Jr. | Nov. 8, 1938 |